United States Patent

Markling et al.

[11] Patent Number: 5,316,377
[45] Date of Patent: May 31, 1994

[54] COMPOSITE INJECTION-BLOW MOLDED WHEEL AND METHOD OF FABRICATION

[75] Inventors: Floyd F. Markling, Fort Myers, Fla.; Tracy A. Markling, Delavan, Wis.; Robert A. Harlow, Harvard, Ill.

[73] Assignee: Poly-Flex, Inc., Walworth, Wis.

[21] Appl. No.: 875,676

[22] Filed: Apr. 29, 1992

[51] Int. Cl.$^5$ .............................. B60B 3/12; B60B 5/02
[52] U.S. Cl. ................................... 301/64.7; 301/64.1
[58] Field of Search .................... 301/64.7, 63.1, 64.1, 301/5.3, 5.7; 152/323, 324

[56] References Cited

U.S. PATENT DOCUMENTS

| | | | |
|---|---|---|---|
| 1,560,551 | 11/1925 | Eger | 152/324 |
| 1,687,113 | 10/1928 | Stockdale | 152/323 X |
| 2,969,254 | 1/1961 | Molt | 152/323 X |
| 3,387,894 | 6/1968 | Louik | 301/64.7 |
| 3,870,372 | 3/1975 | Knipp | 301/64.7 |
| 4,592,595 | 6/1986 | Freeman | 301/64.7 |
| 5,104,198 | 4/1992 | Prout et al. | 301/64.7 X |
| 5,129,709 | 7/1992 | Klamer | 301/5.3 |

FOREIGN PATENT DOCUMENTS

| | | | |
|---|---|---|---|
| 900 | 10/1909 | United Kingdom | 301/5.3 |
| 191545 | 1/1923 | United Kingdom | 152/324 |

Primary Examiner—Russell D. Stormer
Attorney, Agent, or Firm—Douglas L. Tschida

[57] ABSTRACT

A composite molded wheel assembly and method of construction wherein a separately formed injection molded tread is flow melt bonded to a blow molded rim. The tread may comprise multiple tread pieces which are spaced over a tread surface. Bond enhancing grooves and/or projections may be provided on inner surfaces of the tread pieces and/or rim. The tread pieces flow melt bond to the rim during the molding of the rim. The rim includes an axle bore containing hub, a tread support wheel box and a plurality of connecting spokes and intervening web pieces. The method includes the steps of preparing and retaining the tread within the rim forming mold, introducing a parison of rim material having a melt temperature greater than the tread material, injecting pressurized air or gas to conform the rim material to the mold and tread pieces and controlling the molding cycle temperature, pressure and time parameters to promote bonding.

13 Claims, 8 Drawing Sheets

COMPOSITE INJECTION-BLOW MOLDED WHEEL AND METHOD OF FABRICATION

BACKGROUND OF THE INVENTION

The present invention relates to utility wheels and, in particular, to a plastic, blow molded, compositional wheel.

Within recent times and for many applications, plastic wheels have replaced traditional pneumatic or rubber covered wheels. For limited use or lightweight applications, such as with barbecue carts, lawn mowers, trash containers and many other devices, plastic wheels can serve the same purpose, but at relatively lower costs. Commonly encountered plastic wheel constructions are formed by blow molding, rotational molding or injection molding. Examples of some blow molded wheels can be seen at U.S. Pat. Nos. 221,424 and 325,011, the latter patent being assigned to the present assignee. Such wheels provide a homogeneous, hollow wheel construction which exhibits a relatively hard tread surface.

Injection molded wheels can either comprise a semipneumatic construction or a solid construction. A semipneumatic wheel typically provides an injection molded, solid rim in a comparable configuration to conventional metal rims and to which an appropriate rubber or elastomer tire is mounted. Alternatively, the rim can be constructed to accept a solid rubberized cap or tread piece. Such a tread piece commonly mates with cooperating projections or flanges at the rim to mechanically retain one to the other. A wheel of the latter construction type is shown at U.S. Pat. No. 3,604,756.

Each type of wheel has certain advantages and disadvantages. Injection molded wheels accommodate conventional tires and possibly heavier duty use, but necessarily require very costly molds. Molding characteristics also limit the rim size.

In contrast, blow molded (i.e. extrusion blow molded) and rotational molded wheels require less costly molds. Blow molded wheels can also be cost effectively produced in a variety of design configurations offering structural strengths exceeding injection molded wheels.

Inherent negatives of such wheels, however, are that the core of the wheels are hollow and thus the wheels tend to be "noisy". Depending upon the wheel design, the wall thickness of the wheel may also not be uniform throughout the wheel and thus trade-offs must be made between structural design and material costs. Because the wheels are made entirely of plastic, they also tend to offer less traction than rubber tread wheels. Rotational molded wheels, have additional inherent limitations in design flexibility over blow molded wheels.

To the extent applicant is aware of other composite wheels including plastic or elastomeric treads, U.S. Pat. Nos. 4,485,135 and 4,485,136 disclose alternative methods for patching pneumatic, elastomeric tires that mount to undisclosed rims. U.S. Pat. No. 4,530,959 discloses a pneumatic tire having a sulfur cured elastomeric tread composition. U.S. Pat. No. 2,197,127 discloses a pneumatic tire including a flexible rubber face and to which an olefin based plastic is bonded via an intermediate uncured rubber composition.

U.S. Pat. No. 4,490,197 also discloses a conventional method for retreading a rubber pneumatic tire which comprises the abrading and buffing of the surface of a tire carcass, prior to molding a replacement tread to the carcass.

U.S. Pat. No. 4,095,637 discloses a composite wheel including a preformed cast metal rim and to which a rubber tire tread is injection molded. The rim is separately prepared from the tread, inserted into the injection mold and the tread is cast in place about the rim. A flow melt method is not disclosed nor a wheel including a blow molded rim and relative to which a separately prepared tread surface is flow melt bonded.

Appreciating the foregoing advantages and disadvantages of blow molded wheels and the state of the art, the present invention was conceived. The invention comprises a blow-molded wheel construction that is relatively noise free. The wheel also provides a tread surface of controlled thickness and having tailorable traction properties.

SUMMARY OF THE INVENTION

It is accordingly a primary object of the present invention to provide an extrusion, blow molded plastic wheel in a relatively noise free construction and having a tread surface of tailored thickness and density.

It is a further object of the invention to provide a blow molded wheel wherein the tread surface is formed from a homogeneous or heterogeneous material that is separately molded from the rim, but which flow melt bonds to the rim during the blow-molding of the rim.

It is a further object of the invention to provide a multi-piece, injection molded tread which can include a plurality of recesses or projections at the bonding surface to promote adhesion with the rim.

It is a still further object of the invention to provide a blow molded rim which includes an axle bore, a surrounding hub, an outer tread support or wheel box and a plurality of interconnecting spokes and intervening webs which extend between the spokes. The rim is molded to a uniform thickness.

It is a still further object of the invention to provide a composite blow molded wheel construction which can be formed within a mold time comparable to that of a wheel without a separately bonded tread piece.

Various of the foregoing objects, advantages and distinctions of the invention are attained in a presently preferred construction wherein a method and improved composite blow molded wheel are disclosed. The wheel provides a blow molded rim which supports a separately molded, single or multi-piece tread from the rim. In one construction a pair of symmetrical tread pieces are formed which overlie a portion of the sidewall and substantially cover the tread surface, except for a center, annular gap. Appropriate tread patterns are formed into the tread surface to facilitate traction.

The tread pieces are formed of a homogeneous or heterogeneous material to that of the rim material to facilitate flow melt bonding. The tread pieces provide an undercut design and mate at the annular gap or pinch-off area of the wheel. Such a construction results in a marked noise reduction in the wheel box.

The tread pieces may include a plurality of lateral grooves or lateral or annular projections or ribs along an inner bonding surface to facilitate bonding with the rim. These lateral grooves also facilitate air release during part cooling.

During molding the tread pieces are inserted into an blow mold form where they are retained during the blow molding of the rim. The rim includes an outer, annular tread support or wheel box which is supported from a plurality of radially projecting spokes and interconnecting webs to a central, bored hub. The numbers and positioning of the spokes and the relative thicknesses of the outer tread support and hub can be varied to provide desired strength.

In a preferred method, the operating temperature of the tread pieces is selected to be within a range of 250 to 350 degrees Fahrenheit relative to an extrusion blow molded rim material having a flow temperature in a range of 350 to 450 degrees Fahrenheit. The materials may either be homogeneous or heterogeneous provided that desirable flow characteristics are obtained to facilitate cohesion and flow melt bonding at the tread surface. The cohesion must be maintained during cooling of the composite part.

Still other objects, advantages and distinctions of the invention will become more apparent upon reference to the following detailed description with respect to the appended drawings. The description should not be interpreted in strict limitation of the invention. Rather, the invention should be interpreted to include all those equivalent embodiments within the scope of the following appended claims. To the extent various modifications and improvements have been considered, they are described as appropriate.

DESCRIPTION OF THE PREFERRED EMBODIMENT

Figure 1:
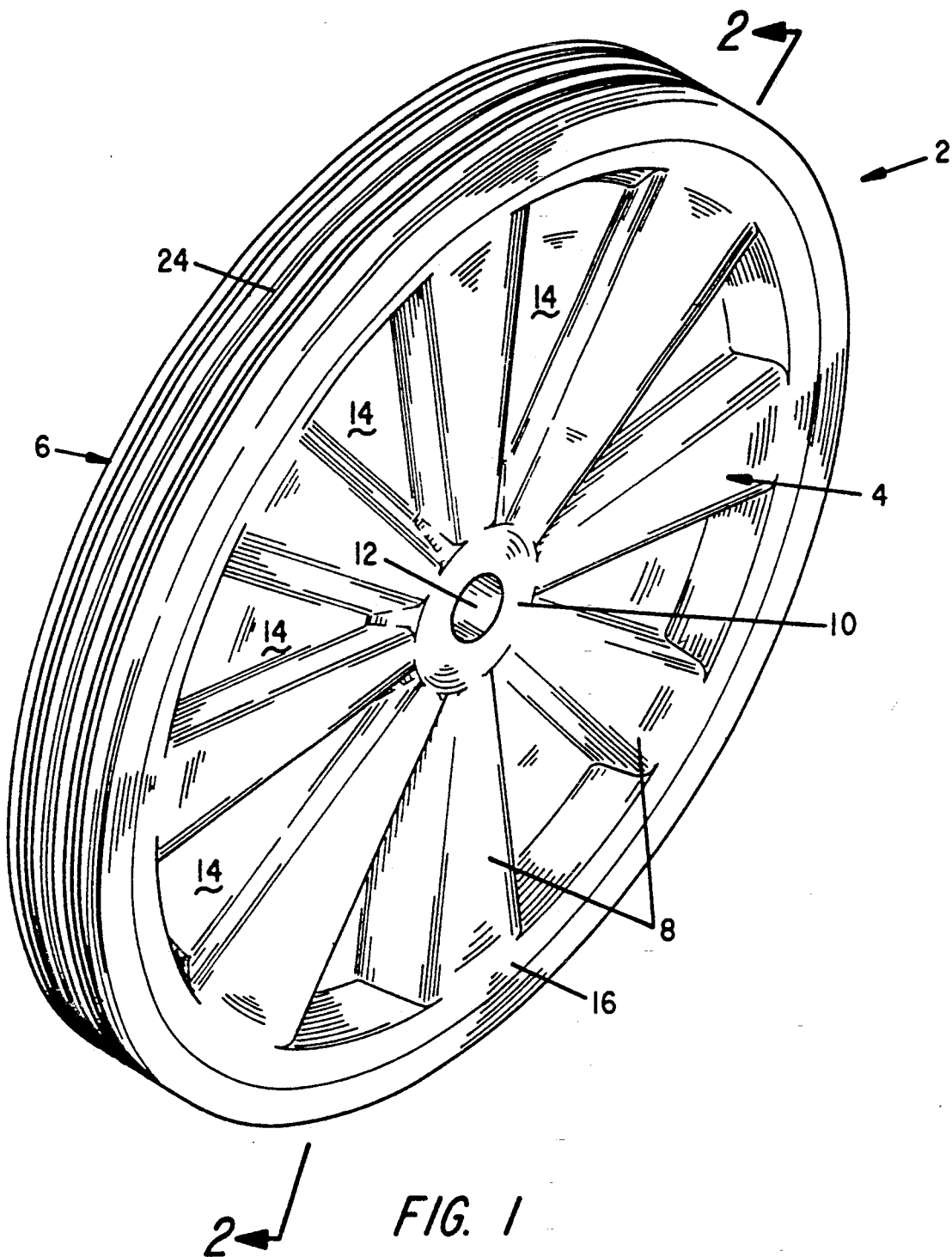
FIG. 1 is an isometric drawing of an improved compositional wheel wherein injection molded tread pieces are flow melt bonded to a blow molded rim.

Referring to FIG. 1, an isometric drawing is shown of an improved composite wheel 2 which was constructed in an improved blow molding process described below. The wheel 2 provides a blow molded rim 4 and to which a separately formed tread 6 is flow melt bonded during the molding of the rim 4. The rim 4 is extrusion blow molded in a two-piece mold and is typically molded from a relatively high density polyethylene material. A plurality of spokes 8 radiate from a center, annular hub 10. An axle bore 12 extends laterally through the hub 10. Planar webs 14 of material extend between each of the adjacent spokes 8. An outer, annular tread support or wheel box 16 circumscribes the spokes 8 and is coupled to the hub 10 via the spokes 8 and webs 14.

Depending upon the application, the radial length of the box 16, hub 10 and spokes 8 can be varied relative to one another. Optimal wheel strengths can be achieved when the box and hub portions 16, 10 are each formed within a range of one fourth to one third of the wheel radius. That is and with reference to FIG. 2 and the lower half cross section taken through the web 14, an I-beam configuration is presented. This configuration has proven particularly advantageous for use with wheels intended for relatively heavy duty use, such as with trash carts, lawn mowers, utility carts and the like. The upper half of the cross section drawing of FIG. 2 is taken through the center of one of the spokes 8.

Figure 2:
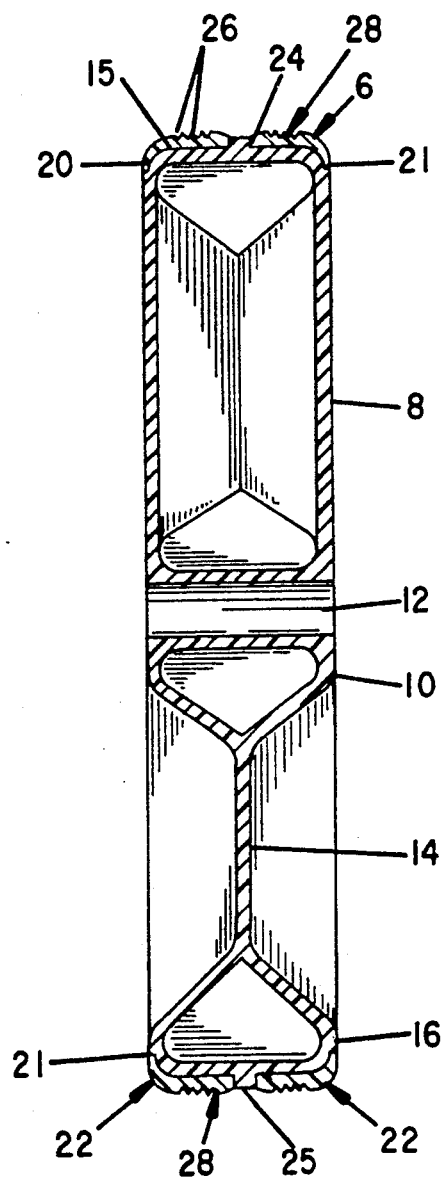
FIG. 2 is a cross section drawing taken along section lines 2—2 of FIG. 1.
Figure 3:
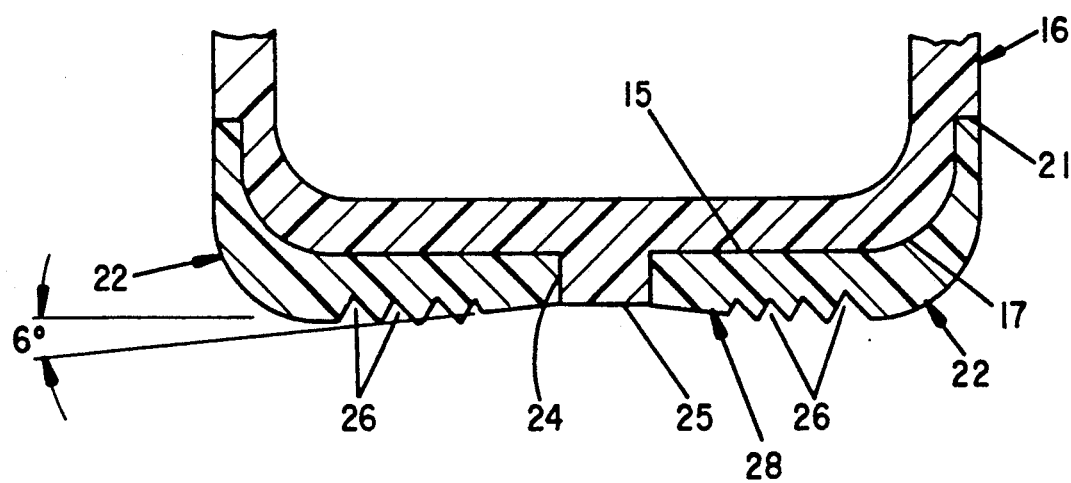
FIG. 3 is a detailed cross-section drawing depicting the undercut tread construction.

With attention to FIGS. 2 and 3, the outermost surface 15 of the wheel box 16 is flat across substantially its entire width, except at the lateral edges 17 where the walls of the wheel 2 curve around to the box sidewalls 20 and an inlet flange 21. It is to the surface 15 that the tread 6 flow melt bonds during the forming of the rim 4. Although a flat surface 15 and inlet sidewall surface 20 are presently provided, it is to be appreciated that annular or lateral grooves, cross hatched grooves or combinations thereof may be provided within the surface 15 to facilitate bonding and prevent delamination between the tread 6 and the rim 4. Alternatively, varieties of annular or lateral ribbed projections or varieties of stud-like projections or combinations thereof can be formed as part of the surface 15 to facilitate retention of the tread 6 to the wheel. More of the details of such surfaces are shown at FIGS. 7 through 11 and are described in greater detail below.

With particular attention to FIG. 3, a magnified cross section view is shown the tread bonding surface 15. As presently configured, the tread 6 comprises two symmetrical annular pieces 22 which bond to the surface 15 and extend over to the sidewalls 20, see also FIGS. 2 and 6. A gap 24 is provided between the tread pieces 22 and where air is partially released during bonding to the wheel box portion 16. The gap 24 particularly occurs at the annular midline of the wheel or pinch-off area where the mold halves meet. An annular rib 25, formed during the extrusion of the rim 4, extends into the gap 24.

A plurality of annular, tread grooves 26 are provided in the outer, wear surface 28 of the tread 6. The grooves 26 in combination with the gripping properties of the tread material provide suitable traction for the normal terrain over which the wheel 2 operates, that is, concrete and asphalt for trash cart wheels.

Figure 4:
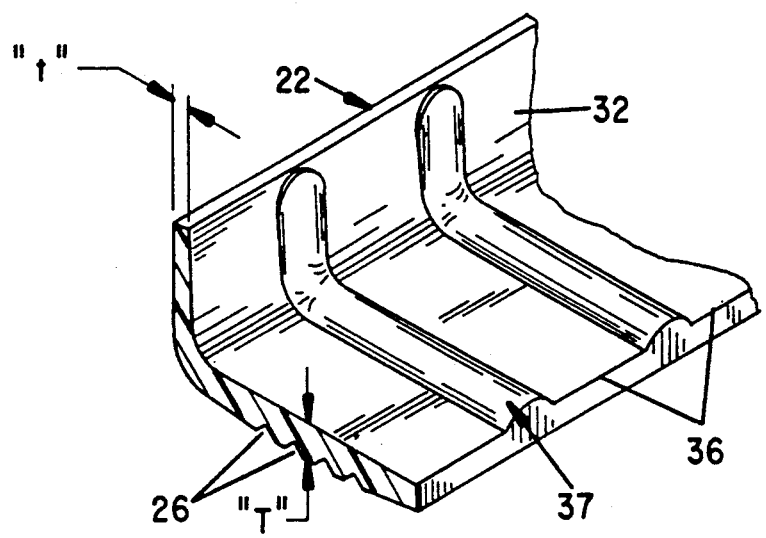
FIG. 4 is an isometric drawing of a portion of one of the symmetrical tread pieces.

With additional attention to FIG. 4, the thickness of each tread piece 22 tapers from a thickness "T" at the wear surface 28 to a thickness "t" at the ledge 21 at the sidewalls 20. The ledge 21 mates with the tread pieces 22 such that the outer surfaces of the rim 4 and tread 6 along the box sidewalls 20 are co-planar.

A six degree undercut is also provided in each tread piece 22 adjacent the gap 24. The tread pieces 22 are positioned such that the decling taper at the wear furface of each tread piece 22 extends toward the center of the wheel 2. The combined undercut produces a cupping or shallow groove at the annular midline which in combination with the tread material and thicker tread surface have proven advantageous in creating a less "noisy" wheel 2. The wheel 2 has particularly proven comparable to injection molded wheels and is less costly to produce. The taper of the undercut can be adjusted, as desired, but typically would be set in a range of 2 to 10 degrees, which provides noise reduction and also accommodates tread wear.

Although annular grooves 26 are provided in the tread surface 28, it is to be appreciated a variety of lateral or cross hatched grooves or combinations thereof may be provided in conventional fashion, such as with automotive and bicycle tires. Depending upon the amount of traction required and the normal wear surface, more or less grooves 26 can be provided. The pattern may also be adjusted for water, dirt, grass or other materials which may affect the gripping of the wheels.

The tread pieces 22 are constructed from a low density, relatively soft polyethylene material of the polyolefin family. The material particularly comprises an ethylene-ethyl acrylate (EEA). This material doesn't readily bond to polyethylene using traditional adhesion methods, such as RF sealing, ultrasonic bonding or spin welding. EEA, however, is commercially available in a number of compositions which accommodate a variety of operating temperatures or melt ranges below that of the materials used to blow mold the rim 4. Two 18% EEA compositions having respective 20 and 6 melt ranges have been shown to provide desirable wheels. The lower temperature (i.e. 20 melt) material is softer and more readily assures proper bonding, but is less scuff resistant.

Alternative tread materials may comprise ethyl-vinyl acetate (EVA), low density polyethylene (LDPE) or linear, low density polyethylene (LLDPE). Various of the foregoing materials may also be blended, as necessary, to provide desirable mechanical properties for a particular application.

An EEA tread material is presently preferred for the wheel 2 because it is relatively durable and readily bonds under flow melt conditions to the polyethylene rim 4. The EEA material is also less dense than many materials, in particular, the polyethylene materials used to mold the rim 4. The tread 4 thus exhibits a softer texture than the rim 4, which produces improved traction between the wheel 2 and terrain. Depending upon the application, it may however be desirable to use a harder tread material, similar to that of the rim 4.

The melt ranges of the tread 6 and rim 4 materials are selected such that adhesion is maintained between the tread 6 and rim 4 throughout the molding/cooling cycle. This is especially critical, since even though the rim and tread materials may readily bond to one another during molding, delamination can occur during cooling. The rim 4, particularly in the region of the box 16, may cool at a faster rate than the tread pieces 22. "Sinking" can occur at the bonding surface 15 and produce air gaps or less than optimal adhesion. Any air gaps can later result in premature failure of the wheel 2 with the delamination of all or a portion of the tread 6 at the surface 15.

In addition to improved traction, the wheel 2 evidences a much quieter operation in its normal applications. This improvement is attributed to the added thickness "T" of the tread 6 at the wear support surface 28, the properties of the EEA material and the undercutting of the tread pieces at the annular midline of the wheel. Even though blow molded wheels generally exhibit greater integrity than injection molded wheels, because the core of the wheel 2 is hollow (reference FIG. 2), sounds are commonly magnified as the wheel surfaces vibrate, much in the same fashion as a drum or speaker. Some users have thus objected to the sound qualities of blow molded wheels. The combination of the foregoing features, however, serve to deaden any sounds created by the wheel 2.

The thickness and density of the tread material can also be varied to further enhance these design properties. However, as the thickness "T" is increased, a greater propensity exists for delamination. Softer materials also tend to wear faster and may delaminate under heavy loading.

Although non-composite wheels could be blow molded with thicker walls and tread surfaces 15, because of the nature of the blow molding process, it is very difficult to produce walls of controlled and/or uniform thickness at selected areas of a wheel. This reality reduces the flexibility of tailoring certain portions of a wheel to an application. Therefore, even though a quieter, thicker treaded wheel might be formed in a homogeneous blow molding process having less temperature sensitivity, it would be at the expense of significantly greater quantities of raw materials and reduced design flexibility. The present composite wheel construction has thus proven very significant.

Figure 5:
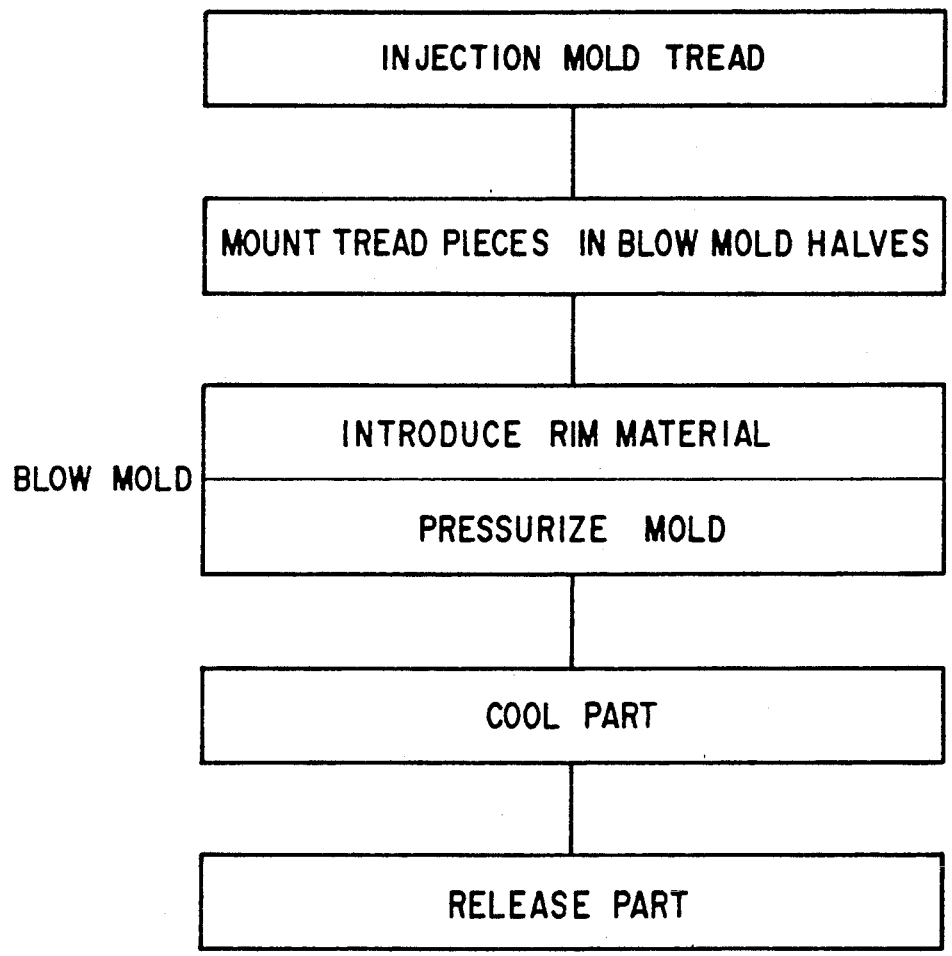
FIG. 5 is a flow diagram of the method for constructing the composite wheel of the invention.

With attention to FIG. 5, a general process flow diagram is shown of the method used to construct the wheel 2. The process begins with the separate forming of the tread pieces 22 in a conventional injection molding process. The cycle times and molding characteristics are adjusted to the materials being molded. Each annular tread piece 22 is formed to mate with the mold 30 used to blow mold the wheel 2 (reference FIG. 6).

With the molding of each tread piece 22, any "sprue" is removed as the tread pieces are prepared for insertion into the mold 30. Although not presently required, such processing may include the scrubbing or roughening of the inner surface 32 of each tread piece 22. Chemical bonding or bond promoting agents may also be used, as necessary.

Figure 6:
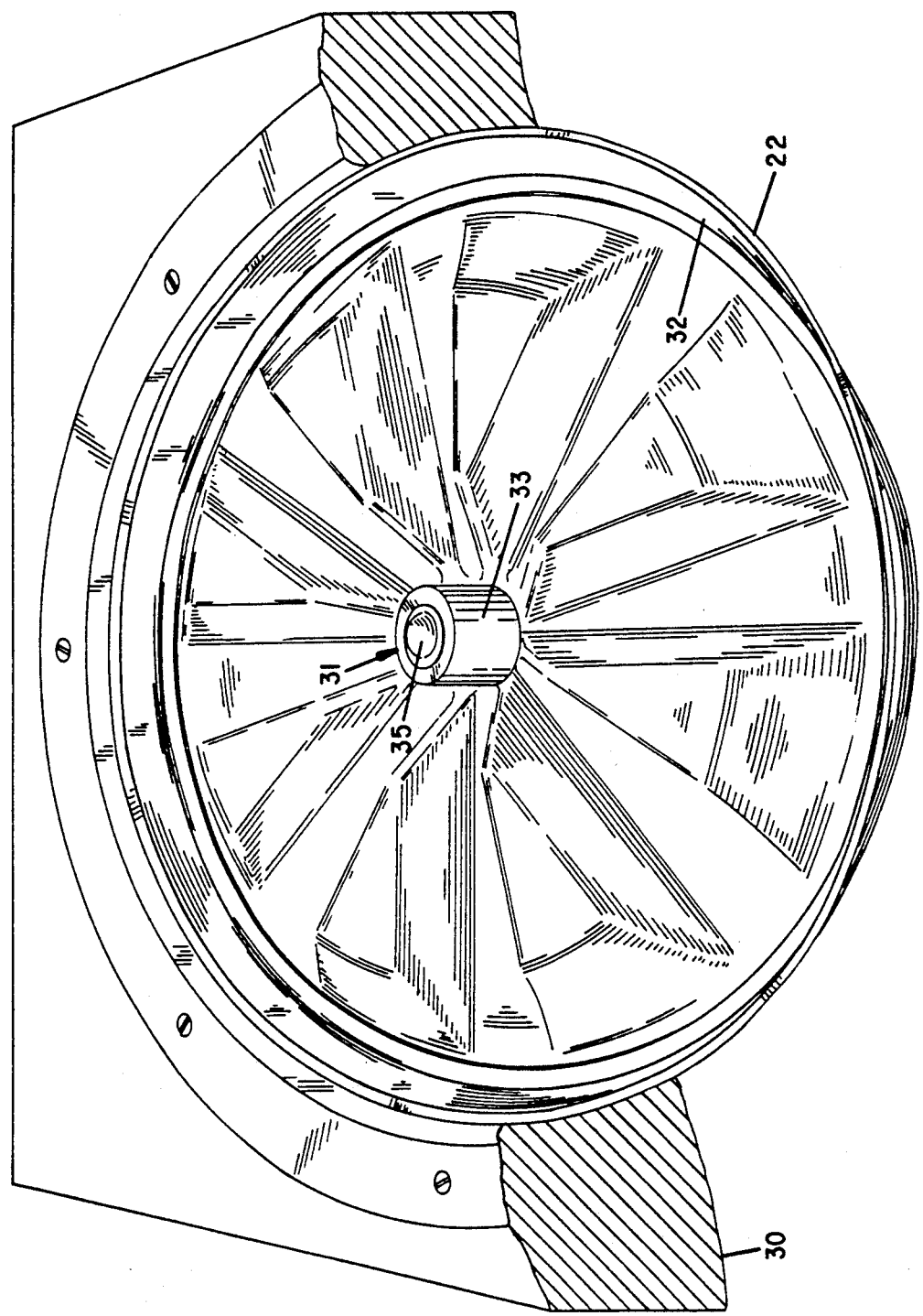
FIG. 6 is an isometric drawing of one half of the extrusion mold used to mold the wheel of FIG. 1 and wherein one of the tread pieces is mounted.

FIG. 6 depicts one of a pair of symmetrical extrusion molds 30 which are used to form the wheel 2. Water cooling channels within the molds 30 (not shown), parison pinch-offs (not shown), and air or gas access ports or needles (not shown) are provided in conventional fashion to effect proper molding. The axle bore 12 is defined by a two-part capped bushing assembly 31 provided at the center of the mold 30. An outer, knockout sleeve 33 facilitates removal of the wheel from a fixed center pin 35.

During the forming of a wheel 2, each mold 30 is separately fitted along an inner periphery with one of the tread pieces 22. Separate retainers are not presently required to maintain the position of the tread pieces 22 within the molds 30, due to the rigidity of the material. On occasion, it may be necessary to provide grooves or other mechanisms within the mold 30 to facilitate retention.

A parison of a molten polyethylene rim material is next extruded and vertically suspended between the mold halves 30. Typically the rim material is heated to a molten state and temperature in a range from 350 to 450 degrees Fahrenheit. The material is introduced to form the parison and is pinched-off as the mold closes.

The molds 30 are closed about the parison and air or gas is injected via one or more needles which are inserted into the parison. The air is directed such that the rim material is blown onto the contoured wall surfaces of the molds 30. The blown rim material thereby retains the tread pieces 22 against the mold walls.

The relative temperatures of the tread pieces 22 and rim material are such that the hot rim material coats and melts the inner surface 32 of each tread piece 22 to coalesce and form an integral bond with one another. Depending upon the materials, the molds may also be pre-heated to soften the tread pieces 22.

For the presently preferred wheel 2, an EEA material is used to form the tread pieces 22 and a polyethylene is used for the rim 4. The EEA material is selected in a composition having a melt temperature in the range of 250 to 300 degrees Fahrenheit and the rim 4 material is selected to have a melt temperature in the range of 375 to 450 degrees Fahrenheit. Other relative temperature ranges could be used, provided the materials will flow melt bond to one another.

The principle shortcoming encountered to date in the development of the wheel 2 has been the need to extend the dwell time of each wheel 2, approximately 2½ to 6 times that for a non-composite wheel. The additional time has been necessary to prevent the formation of air pockets at the bonding surface 15, which can produce delamination. The increased cooling time within the mold particularly prevents any sinking of the bonding surface 15.

Appreciating the foregoing potential for delamination between the rim 4 and tread 6, efforts have been extended to reduce the dwell time and release air which may form or become trapped at the bonding surface 15 during molding. These efforts have produced acceptable wheels in a typical mold cycle time of 1X to 2X at air or gas pressures of 80 to 150 psi and dwell times of 1Y to 1.5Y; where X and Y are comparable values for a non-composite wheel of identical design.

Returning attention to FIG. 4, an isometric drawing is shown of a portion of one of the tread pieces 22 wherein a plurality of lateral grooves 36 have been formed between curved projections 37. The grooves 36 facilitate a release of air into the gap 24 and along the sidewall 20 at the ledge 21 during the molding process. Due to the melting of the surface 32 and coalescing of the rim and tread materials during molding, the grooves 36 disappear during the molding process, however, not before releasing any trapped air.

Figure 7:
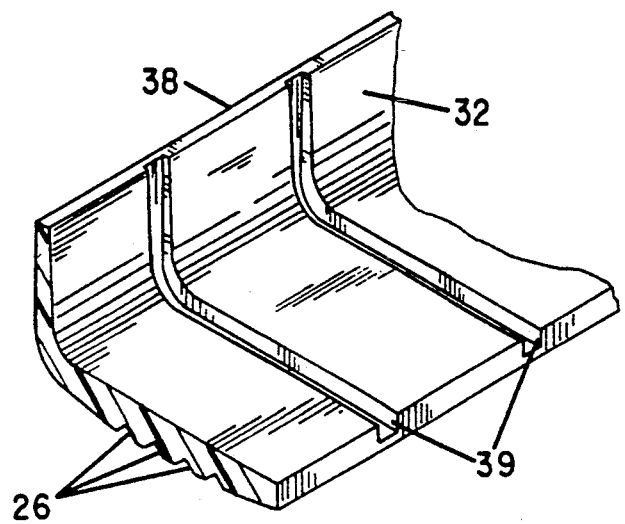
FIG. 7 is an isometric drawing of a portion of a first alternative tread piece including a grooved bonding surface.

Although the lateral grooves 36 have proven effective, varieties of other groove/projection patterns may be used. FIG. 7 depicts an alternative tread piece 38 wherein slots 39 are let into the bonding surface 32.

Figure 8:
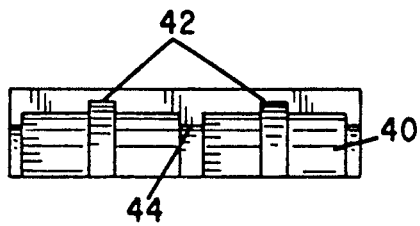
FIG. 8 is an elevation drawing depicting a second alternative bonding surface of a tread piece.

With further attention to FIGS. 8 through 11, still other alternative bonding surface configurations are shown including lateral grooves, slots and/or projections. FIG. 8 depicts a tread piece 40 which includes grooves 42 and projections 44. The projections 44 are provided to facilitate the forming of the surface 15 about the projections. Any potential delamination is thereby minimized due to the mechanical adhesion of the rim 4 about the projections 44.

The depth of the grooves 42 or height of projections 44 are typically adjusted to take into account the melting that occurs at the bonding surface 15. The projections 44 and/or 37 may also comprise annular or lateral ribs or studs or combinations thereof.

Figure 9:
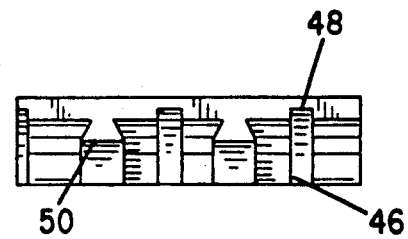
FIG. 9 is an elevation drawing of a third alternative bonding surface of a tread piece.
Figure 10:
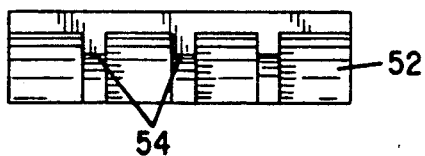
FIG. 10 is an elevation drawing of a fourth alternative bonding surface of a tread piece.

The ribs or studs may also be undercut, to provide enhanced bonding. FIG. 9 depicts a tread piece 46 having lateral grooves 48 and dove-tailed projections 50. FIG. 10 depicts a tread piece 52 exhibiting only ribbed projections 54.

Figure 11:
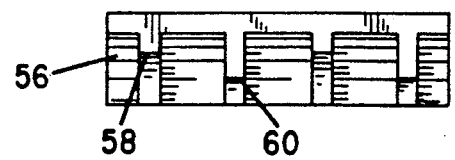
FIG. 11 is an elevation drawing of a fifth alternative bonding surface of a tread piece.

Depending upon the height and spacing between the projections 54, some projections may serve to retain the tread piece 52, while others create an air channel and melt away. FIG. 11 particularly depicts a tread 56 having alternating short projections 58 and long projections 60.

While the invention has been described with respect to its presently preferred embodiment and alternatively considered modifications and improvements thereto, still other constructions may suggest themselves to those skilled in the art. The following claims should therefore be interpreted to include all those equivalent embodiments within the spirit and scope thereof.

What is claimed is:

1. A wheel comprising:
   a) a molded plastic rim including an annular hub having a bore, an annular tread support having a bonding surface, and a plurality of spokes, which spokes couple said tread support to said hub, and further including a plurality of hollow cavities; and
   b) first and second annular tread pieces bonded to said tread support and spaced apart from one another to provide an annular gap at said boning surface and wherein a wear surface of each of said tread pieces tapers in a range of 2 to 10 degrees of declination toward the gap.

2. A wheel as set forth in claim 1 wherein said tread pieces include a plurality of annular grooves on said wear surface.

3. A wheel as set forth in claim 1 wherein a portion of each of said tread pieces extends onto a sidewall of said tread support.

4. A wheel as set forth in claim 3 wherein each of the tread pieces includes a plurality of projections having portions which are flow melt bonded to said tread support.

5. A wheel as set forth in claim 4 wherein coalesced materials of the flow melt bond flow about ones of said plurality of projections.

6. A wheel as set forth in claim 4 wherein said projections extend the lateral width of a bonding surface of each tread piece.

7. A wheel as set forth in claim 4 wherein vertical walls of ones of said projections taper to define an undercut region to contain coalesced materials of the flow melt bond.

8. A wheel as set forth in claim 3 wherein each tread piece includes a plurality of grooves which grooves are flow melt bonded to said tread support.

9. A wheel as set forth in claim 1 wherein said tread pieces are comprised of a material having a flow melt temperature less than a melt temperature of the tread support.

10. A wheel as set forth in claim 9 wherein said tread comprises a material having a flow melt temperature in the range of 250 to 350 degrees Fahrenheit.

11. A wheel as set forth in claim 10 wherein said rim comprises a material having a flow melt temperature in the range of 350 to 450 degrees Fahrenheit.

12. A wheel as set forth in claim 9 wherein said tread comprises a polyolefin material selected from a class consisting of ethylene-ethyl acrylate (EEA), ethyl-vinyl acetate (EVA), low density polyethylene (LDP), linear low density polyethylene (LLDP) or compositions of said EEA, EVA, LDP, and LLDP.

13. A wheel comprising:
   a) a molded plastic rim including an annular hub having a bore, an annular tread support, a plurality of spokes and a plurality of webs which extend between adjacent ones of said plurality of spokes, wherein said spokes and webs radially extend between said tread support and hub and wherein said spokes, said tread support and hub are hollow; and b) a tread secured to said tread support at an interface comprised of a composition of thermally melted and coalesced materials of said rim and said tread support and comprising a pair of annular tread pieces, wherein a portion of each tread piece extends onto a sidewall of said tread support, wherein each tread piece includes a surface which tapers int the range of 2 to 10 degrees of declination toward an annular midline of the wheel and the tread pieces are spaced to provide an annular gap in the region of the midline, and wherein each tread piece includes a plurality of projections having portions coalesced to the rim.

* * * * *